Patented Aug. 9, 1932						1,870,427

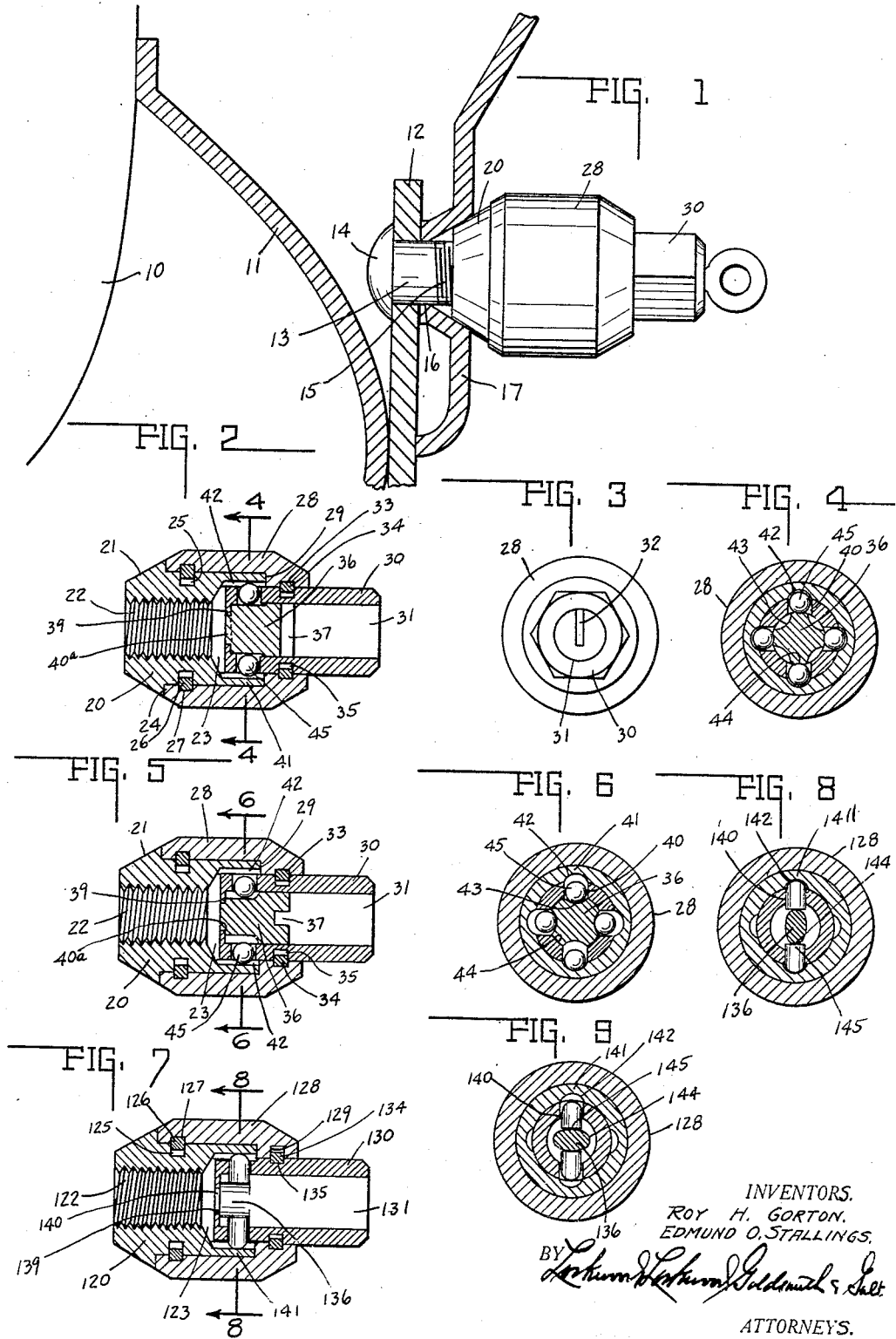

UNITED STATES PATENT OFFICE

EDMUND O. STALLINGS AND ROY H. GORTON, OF INDIANAPOLIS, INDIANA, ASSIGNORS, BY MESNE ASSIGNMENTS, TO RALPH G. LOCKWOOD, OF INDIANAPOLIS, INDIANA

LOCK

Application filed April 28, 1928, Serial No. 273,538. Renewed March 16, 1931.

This invention relates to a compact locking nut which is particularly adaptable to lock spare wheels and rims to wheel carriers or wheels and rims to the running wheels if desired.

The chief object of this invention is to provide a lock of relatively few parts and these of simple construction and protect the two main parts by a sleeve type housing that is always freely rotatable whether the two main parts be operatively disassociated or associated together.

The chief feature of the invention consists in the accomplishment of the foregoing object by having a threaded nut and a lock housing lockingly associated together when the lock is unlocked and the association protected by a sleeve which is locked to both of the before-mentioned parts but is freely rotatable upon either or both at all times.

The full nature of the invention will be understood from the accompanying drawing and the following description and claims:

In the drawing Fig. 1 is a central sectional view of parts to be associated together with the associated bolt and the combination lock and nut with key inserted shown in elevation. Fig. 2 is a longitudinal sectional view of one form of lock. Fig. 3 is an end view of the lock end thereof. Fig. 4 is a transverse sectional view taken on line 4—4 of Fig. 2 and in the direction of the arrows, Figs. 2 and 4 showing the nut and lock operatively or rigidly connected together. Fig. 5 is a view similar to Fig. 2 and of the same parts but showing the lock and nut in the disassociated or inoperative position. Fig. 6 is a view similar to Fig. 4 but is taken on line 6—6 of Fig. 5 and in the direction of the arrows and shows the parts in the disassociated position. Fig. 7 is a view similar to Fig. 2 and of a modified form of the invention, parts being shown in the position corresponding to the position of the parts shown in Fig. 2. Fig. 8 is a transverse sectional view taken on line 8—8 of Fig. 7 and in the direction of the arrows and shows the nut and lock parts in locked position. Fig. 9 is a view similar to Fig. 8 but shows the same parts in the unlocked position.

In the drawing there is conventionally illustrated a portion of a vehicle 10 having the supporting brackets 11 and the rim or wheel support member 12 which is adapted to receive a bolt 13 having the head portion 14 and a threaded portion 15. The bolt projects through an opening 16 of the wheel 17 or the support 12 and wheel 17 may be reversed. A clamping nut is usually associated with the bolt 13 and in the present invention is of the lock control type.

All of the before mentioned is old in the art and it is likewise old in the art to provide a threaded sleeve or nut for threading and axial movement upon the bolt, thus constituting one portion of the locking nut and associating therewith a housing or casing in the form of a sleeve and associating with said sleeve housing or casing a locking portion which is adapted to lock the casing to the nut so that the casing can be engaged by a tool for backing off the nut or tightening up the same when the lock is suitably actuated.

The present invention departs from the foregoing in that the details of the specific cam and locking or wedge members are of improved character and also that the sleeve housing or casing is not at any time rigid with either the nut or the lock but is freely rotatable relative thereto at all times.

The advantage of this construction is that a thief in actuating the prior art locks always endeavored to wedge the casing and lock together and then back off the nut casing and lock. The present invention permits the thief to wedge the casing to the lock but does not permit the thief to remove the nut. A second wedging in a relatively inaccessible location is necessary. Also except for the portion immediately adjacent the clamping portion of the nut, the nut is completely enclosed by the sleeve housing or casing and the locked portion may be damaged by the thief or the end removed without permitting the thief to remove the nut from the bolt.

20 indicates the nut body having a tapered exterior 21 and an internally threaded portion 22 terminating in a chamber 23. A shoulder 24 is provided but the same is not necessary for the exterior body portion of the nut includes a groove 25 adapted to receive a split locking ring 26 which is receivable by a similar and complementary groove 27 in the tubular housing sleeve-like in character and comprising casing 28 of the lock. The exterior of this sleeve-like casing may be suitably knurled. Thus, the nut body and the casing are locked together against axial movement but are relatively rotatable at all times.

The lock construction includes a lock housing 30 with the lock cylinder 31 therein having the keyhole 32. The lock housing is rotatably mounted in the sleeve casing 28 and the latter includes the shoulder 29 and an annular interior groove 33 adapted to receive a split locking ring 34 which is also seatable in a registering annular groove 35 of the lock housing 30. The lock housing 30 extends into the casing 28 and into the chamber 23 of the nut 21 and the portion included in said chamber constitutes the wedging construction support. The wedge includes a cam 36 pivotally mounted in the lock cylinder 30 and having a tongue and groove connection 37 with the lock cylinder. The member 36 comprises a cam construction which is centered by an inwardly extending flange 39 seatable in the groove 40 of the enclosed end of the lock housing. The lock housing in Figs. 2 to 6 inclusive, includes radially extending apertures or recesses 40. The flange 41, which forms the chamber 23 in the nut is semi-cylindrically recessed as at 42. The member 36 is recessed similarly as at 43, leaving the high places 44 therebetween. When the cam 36 is rotated, as shown in Fig. 4 as well as Fig. 2, the balls 45 ride in the slots or openings 40 and are projected laterally outward by the high places 44 into the semi-cylindrical grooves 42 of the nut flange and thus lock the nut to the lock housing.

When the lock is turned it assumes the position shown in Figs. 5 and 6 and the balls 45 are permitted to move freely in and out in the registering slots and there is sufficient depth to the two slots 43 and 40 when in registration to permit the balls 45 to be completely nested therein, that is, clear the inner wall of the chamber 23. This clearance is shown by the three upper balls in Fig. 6. The lower ball, of course, rides in the other portion but since it has sufficient space in which to move, rotational movement of the lock housing will permit the ball to reciprocate axially with all the freedom necessary to permit the lock housing to rotate relative to either the casing or the nut 20, or both. Axial displacement between the several parts is prevented by the locking rings aforesaid, while the several parts are freely rotatable relatively at all times except when the wedge or locking members are projected into engagement with the nut, whereupon the lock housing and nut are rigidly connected together.

In Figs. 7 to 9, inclusive, a modified form of the invention is illustrated and in this form the nut 120 has a chamber 123 formed therein, is threaded as at 122 and includes an annular groove 125 receiving the locking ring 126. The sleeve 128 has a complementary groove 127 for receiving said locking ring 126 and the sleeve 128 includes the recess 129 which receives ring 134 which prevents the lock housing 130 from escaping axially from said sleeve but permits said sleeve to rotate freely in said casing.

The lock 131 is connected in the usual manner to the cam 136 having a reduced portion seatable in the aperture 140 of the flange 139. The cam 136 has the enlargements 144 which are adapted to engage the flat inner faces of the projecting pins 145, the outer heads of which are semi-spherical and are adapted to project through the slots 140 into the semi-cylindrical grooves 142 in the extension or flange 141 of the nut.

The operation of this device is substantially the same as before described for the ball form of the invention, except that in the present type a pair of pins diametrically positioned, is adapted to register with any diametrical pair of recesses 142. It will be apparent that it is not necessary for these to be located in transverse relation. The same also applies to the modification shown in Figs. 2 to 6, inclusive, and if desired, the entire inner periphery of the flanges 41 and 141 may be semi-cylindrically grooved or corrugated to receive either the pins or the balls, without departing in any way from the invention.

It will be apparent, therefore, that the device consists essentially of a threaded bolt receivable nut body, or a threaded nut receivable projecting bolt body, a lock casing, a lock a cam actuated thereby for operatively connecting the lock casing to the threaded body, said lock casing having a tool engageable exterior, and the junction between the lock casing and the threaded body (including the operative connection) being enclosed by a sleeve casing relatively rotatable with respect to the threaded body and the lock housing at all times and locked against relative axial movement therebetween.

The invention claimed is:

1. A device comprising a body having an exposed threaded portion for bolt and nut connection, a lock housing having a tool engageable exposed portion for rotating the body, a lock supported by said housing, means actuable by the lock for operatively connecting the body and housing together, a peripherally enveloping sleeve casing rotatably mounted upon both body and housing and freely rotatable at all times, and means locking the sleeve to the body and housing for preventing axial separation thereof.

2. In a nut and bolt lock the combination of a threaded body construction adapted for bolt and nut connection, a lock housing therein, a lock therein, ball means for locking the housing to the body for unitary movement, and means operable by the lock for actuating the ball means as aforesaid.

3. A device as defined by claim 2, characterized by the body construction including a sleeve casing peripherally enveloping the adjacent portions of the lock housing and bolt and nut connecting body portion and freely rotatable thereon at all times and maintaining the aforesaid against longitudinal separation.

4. In a nut and bolt lock the combination of a body having an exposed threaded portion at one end and a flange at the opposite end forming an enlarged chamber, a lock housing comprising a tubular portion extending into the casing chamber and a tool engageable opposite exposed portion, said chamber enclosed portion including a plurality of radial recesses therein, a locking member in each recess adapted to engage the body adjacent the enveloping flange for locking the same to the lock housing, and a lock actuated cam means arranged to project the locking members into flange engagement.

5. A device as defined by claim 4, characterized by the flange including a plurality of recesses arranged to receive the locking members and said locking members and walls of said recesses being arranged to cam the locking members out of flange locking engagement when the lock actuated means is moved into inoperative position.

6. The combination with a member having a projection thereon, of a coaxial member having an opening into which said member projects, means preventing coaxial separation but permitting rotation therebetween, means for securing said first-mentioned member to the second mentioned member to prevent rotation therebetween, said means being movable into and out of such securing position, and a key actuated lock mechanism rotatable relative to the first-mentioned member for moving said second-mentioned securing means into securing position in the relative rotation between the key actuated lock mechanism and the first mentioned member.

7. The combination with a member having a projection thereon, of a coaxial member having an opening into which said member projects, means preventing coaxial separation but permitting rotation therebetween, and means for securing said first-mentioned member to the second mentioned member to prevent rotation therebetween, said means being movable into and out of such securing position, a key actuated lock mechanism rotatable relative to the first mentioned member for moving said second-mentioned securing means into securing position in the relative rotation between the key actuated lock mechanism and the first mentioned member, said first-mentioned securing means including a housing peripherally enveloping the members and freely rotatable thereon.

8. The combination with an elongated lock, a supporting member having a projection thereon and coaxially recessed to receive said lock, means coaxially locking the lock and the member together but permitting relative rotation therebetween, said member having a recess, a locking member seated in said recess and movable therein in the relative rotation, another and threaded anchoring member including a chamber at one end telescopically mounting the first mentioned member, said members being relatively rotatable, and means preventing axial separation of said lock supporting member and threaded member but permitting rotational movement therebetween, the chamber of the threaded member having a recess for engagement by the locking member for securing the lock supporting member and chambered member together when the recesses register when the lock is actuated and preventing further rotative movement therebetween.

9. The combination with an elongated lock, a supporting member having a projection thereon and coaxially recessed to receive said lock, means coaxially locking the lock and the member together but permitting relative rotation therebetween, said member having a recess, a locking member seated in said recess and movable therein in the relative rotation, another and threaded anchoring member including a chamber at one end telescopically mounting the first mentioned member, said members being relatively rotatable, and means preventing axial separation of said lock supporting member and threaded member but permitting rotational movement therebetween, the chamber of the threaded member having a recess for engagement by the locking member for securing the lock supporting member and chambered member together when the recesses register when the lock is actuated and preventing further rotative movement therebetween, said means including a housing peripherally enveloping the first mentioned and chambered members and freely rotatable thereon at all times.

In witness whereof, we have hereunto affixed our signatures.

EDMUND O. STALLINGS.
ROY H. GORTON.